US006172368B1

(12) United States Patent
Tarr et al.

(10) Patent No.: US 6,172,368 B1
(45) Date of Patent: Jan. 9, 2001

(54) METHOD OF MONITORING RADIATION USING A FLOATING GATE FIELD EFFECT TRANSISTOR DOSIMETER, AND DOSIMETER FOR USE THEREIN

(75) Inventors: Nicholas Garry Tarr, Ottawa; Ian Thomson, Nepean, both of (CA)

(73) Assignees: Carleton University, Ottawa; Thomson & Nielsen Electronics Ltd., Nepean, both of (CA)

( * ) Notice: Under 35 U.S.C. 154(b), the term of this patent shall be extended for 0 days.

(21) Appl. No.: 09/138,394

(22) Filed: Aug. 24, 1998

(30) Foreign Application Priority Data

Sep. 12, 1997 (CA) .................................... 2215369

(51) Int. Cl.[7] ....................................................... G01T 1/24
(52) U.S. Cl. ............................... 250/370.07; 250/370.14; 250/337
(58) Field of Search ..................... 250/370.07, 370.14, 250/337

(56) References Cited

U.S. PATENT DOCUMENTS

| 4,678,916 | 7/1987 | Thomson . |
| 4,788,581 | 11/1988 | Knoll et al. . |
| 5,117,113 | 5/1992 | Thomson et al. . |
| 5,444,254 | 8/1995 | Thomson . |
| 5,596,199 | 1/1997 | McNulty et al. . |

FOREIGN PATENT DOCUMENTS

WO 95/12134     5/1995    (WO) .

OTHER PUBLICATIONS

Peters et al., "A floating gate MOSFET gamma dosimeter", Can. J. Phys., 74, S685 (1996).
Kassabov et al., "Radiation Dosimeter Based on Flating Gate MOS Transistor", *Radiation Effects and Defects in Solids*, 1991, vol. 116, pp. 155–158.
G.C. McGonigal and H.C. Card, "Analog EEPROMs with Low Programming Voltage for Adaptive Circuitry in Northern Telecom CMOS4S 1.2 $\mu$m Technology", Canadian Conference on Very Large Scale Integration, Banff, Nov. 14–16, 1993.

(List continued on next page.)

Primary Examiner—Constantine Hannaher
Assistant Examiner—Otilia Gabor
(74) Attorney, Agent, or Firm—Thomas Adams

(57) ABSTRACT

An insulated gate field effect transistor dosimeter has a source and drain defining a channel region, a floating gate having a first portion extending over the channel region, and a second, larger portion extending away from said region, a control gate having at least a portion thereof overlapping a first part of the floating gate, and a charging gate overlapping a second part of the floating gate. The area of the second part of the floating gate is much smaller than the area of the first part, and the charging gate is separated from the channel region by the control gate. The dosimeter is charged, before irradiation, by connecting the source, drain and control gate to a common ground and applying a potential difference between the charging gate and the common ground. The charge is supplied to the floating gate by a path which does not require a significant electric stress to be created in the region of the gate oxide and the channel. The dosimeter may comprise two such transistors fabricated on a common substrate, conveniently with a common source. The pair of transistors may be charged by maintaining the sources, drains and control gates within the normal maximum operating voltage relative to each other, and applying different potential differences between the two charging gates, respectively, and the substrate. Following irradiation, the absorbed radiation does is determined by measuring the difference between the threshold voltages of the two transistors. Preferably, the transistors have charges of opposite polarities. This differential arrangement reduces the effects of temperature variations and enhances sensitivity.

7 Claims, 7 Drawing Sheets

OTHER PUBLICATIONS

Aoki et al., "Evaluation of ion implantation charging by using EEPROM", *Nuclear Instruments and Methods in Physics Research* B74 (1993), 306–310.

Friedmann et al., "Plasma–Parameter Dependence of Thin–Oxide Damage from Wafer Charging During Electron–Cyclotron–Resonance Plasma Processing", *IEEE Transactions on Semiconductor Manufacturing*, vol. 10, No. 1 (Feb. 1997), pp. 154–156.

Lukaszek et al., "Charging studies using the CHARM2 wafer surface charging monitor", *Nuclear Instruments and Methods in Physics Research* B74 (1993), 301–305.

METHOD OF MONITORING RADIATION USING A FLOATING GATE FIELD EFFECT TRANSISTOR DOSIMETER, AND DOSIMETER FOR USE THEREIN

FIELD OF THE INVENTION

This invention relates to a method of monitoring radiation using an insulated gate field effect transistor with a floating gate and is especially applicable to dosimetry using so-called "passive" MOSFET dosimeters.

BACKGROUND

Radiation dosimeters which use insulated gate field effect transistors are well known. Some such dosimeters comprise a "floating gate" interposed between a control gate and the channel between the source and the drain. When the dosimeter is in use, the ionizing radiation changes the charge on the floating gate which, in turn, changes the threshold voltage of the transistor. The change in the threshold voltage is a measure of the amount of ionizing radiation to which the dosimeter has been exposed.

Some floating gate dosimeters are "active", in that they require biasing in order for the floating gate charge to be changed by ionizing radiation. Such a floating gate dosimeter has been disclosed by Knoll et al in U.S. Pat. No. 4,788,581 issued November 1988. The floating gate is provided between the usual control gate and the channel between the source and the drain. In the method of operation disclosed by Knoll et al, the floating gate is initially uncharged. To make the dosimeter sensitive to radiation, a bias voltage must be applied to the control gate. Charge generated by radiation in the insulating layers of the floating gate structure moves in response to this control gate bias, and part of the charge is collected on the floating gate. The presence of charge on the floating gate alters the MOSFET electrical characteristics, which allows the absorbed radiation dose to be determined. An experimental demonstration of this method of operation of a floating gate MOSFET dosimeter has been reported by Peters et al in an article entitled "A floating gate MOSFET gamma dosimeter", Can. J. Phys., 74, S685 (1996).

The need for a power supply and biasing limits the application of "active" devices. Where the detector must be attached to or inserted into a patient being treated with radiation; used in space craft where power consumption must be minimized; or attached to a space suit worn by an astronaut during extra-vehicular activity; or attached to the gloved hands of persons handling radioactive materials, for example, it is preferable to use a "passive" dosimeter, which has its floating gate charged before exposure to the radiation. Irradiation causes the charge on the floating gate to change, causing the threshold level of the device to change also. Following irradiation, the "passive" device is connected to a circuit which applies bias and measures the electrical characteristics to determine the change in charge level and hence the amount of radiation to which the device was exposed.

Examples of "passive" dosimeters are disclosed in U.S. Pat. No. 5,596,199 issued January 1997 naming McNulty et al as inventors, in international patent application number WO 95/12134 published May 1995 naming J. Kahilainen as inventor, and in an article entitled "Radiation Dosimeter Based on Floating Gate MOS Transistor" by Kassabov et al in Radiation Effects and Defects in Solids, 1991, Vol. 116, pp. 155–158. Insulated gate field effect transistors with floating gates are also used in EEPROMs, as disclosed at the Canadian Conference on Very Large Scale Integration, Banff, Nov. 14–16, 1993 by G. C. McGonigal and H. C. Card in a disclosure entitled "Analog EEPROMs with Low Programming Voltage for Adaptive Circuitry in Northern Telecom CMOS4S 1.2 $\mu$m Technology". Although Messrs. McGonigal and Card were concerned with providing VLSI designers with a variety of adaptive, non-volatile, analog and digital functions, such as neural network synaptic weights and high-precision circuit trimming, and did not suggest using the device for radiation measurement, they described charging of the floating gate of an insulated gate field effect transistor having a floating gate, a control gate and an injector gate.

Kahilainen (WO 95/12134) describes a floating gate dosimeter without a control gate in addition to the floating gate. The floating gate is charged by applying a sufficiently high voltage between the source and drain to cause tunnelling to occur through the oxide layer of the gate insulator. The other devices each have a floating gate interposed between a control gate and the channel. Thus, Kassabov et al charge the floating gate by applying voltage impulses to the control gate. Likewise, McGonigal and Card charge the floating gate by applying "programming pulses" to the control gate. McNulty et al charge the floating gate by applying a negative voltage between the source and the drain such that electrons from the drain are "swept up" to the floating gate by the more positively charged control gate, which is held at a constant voltage.

A disadvantage of these known methods of charging the floating gate is that they may result in interface states which can give noise and long-term stability problems, particularly in view of the relatively high sensitivity involved in most radiation measurements.

A further disadvantage of known passive dosimeters is their susceptibility to temperature variations. The threshold voltage $V_T$ of a MOSFET varies in dependence upon temperature, which is of concern for a MOSFET dosimeter, since a change in $V_T$ in response to temperature variation could be falsely interpreted as an indication of exposure to radiation. It is known to operate a pair of active MOSFET dosimeters differentially to compensate for temperature variations. Thus, U.S. Pat. No. 4,678,916 issued July 1987, naming I. Thomson as inventor, discloses a dosimeter comprising a pair of insulated gate field effect transistors integrated into the same substrate but biased to different levels during radiation measurement. The output of the dosimeter is the difference between the threshold voltages of the two MOSFETs. Both threshold voltages will be affected to substantially the same degree by temperature variations, but the difference will be substantially unaffected. Although this approach has been used with active dosimeters, the methods of charging the floating gates of the above-mentioned known passive dosimeters are too imprecise for satisfactory differential operation.

An object of the present invention is to eliminate or at least ameliorate the disadvantages of the known method of monitoring radiation using passive floating gate dosimeters and to provide an improved method of monitoring radiation and a dosimeter for use therein.

SUMMARY OF THE INVENTION

According to a first aspect of the present invention, there is provided a method of monitoring ionizing radiation using an insulated gate field effect transistor dosimeter having a source and a drain formed in a substrate, a floating gate separated from the substrate by an insulating layer, a control gate overlapping a first part of the floating gate and insulated therefrom, and a charging gate overlapping a second part of the floating gate and insulated therefrom, the second part being remote from a channel between the source and drain. The method comprises the steps of:

(i) maintaining potential differences between the substrate, source, drain and control gate lower than a maximum normal operating voltage of the transistor;

(ii) establishing a potential difference between the charging gate and the control gate, monitoring a parameter dependent upon a threshold voltage of the transistor, and increasing the potential difference to cause a transfer of charge between the charging gate and the floating gate through the insulating layer material between the charging gate and the floating gate until a predetermined threshold voltage is established without involving excessive electric field stress in the region of the channel;

(iii) with the substrate, source, drain, control gate and charging gate connected in common, exposing the dosimeter to the ionizing radiation; and (iv) following such irradiation, determining the amount of such ionizing radiation absorbed by the dosimeter by measuring a parameter affected by change in the charge applied to the floating gate.

This method of charging avoids a relatively high electric field strength in the gate oxide between the floating gate and the channel, and avoids a relatively high electric stress at the surface of the channel. Preferably, such electric field stress is kept below a level which would cause the creation of states capable of trapping charge at the channel surface.

Preferably, the parameter measured to determine the amount of radiation is the same parameter that was measured during charging of the device. Thus, the absorbed radiation dose may be measured by applying a fixed drain-source bias, measuring the drain current, and adjusting the control gate bias until the drain current is the same as that measured during pre-charging of the floating gate. The control gate bias to achieve this drain current is equivalent to the threshold voltage of the device.

According to a second aspect of the invention, there is provided a method of monitoring ionizing radiation using a dosimeter comprising a matched pair of insulated gate field effect transistors sharing a common substrate, each having a source and a drain formed in the substrate, a floating gate separated from the substrate by an insulating layer, a control gate overlapping a first part of the floating gate and insulated therefrom, and a charging gate overlapping a second part of the floating gate and insulated from both the floating gate and the control gate, the second part being remote from a channel between the source and drain, the method comprising the steps of:

(i) maintaining potential differences between the substrate, source, drain and control gate of each transistor lower than a maximum normal operating voltage of the transistors;

(ii) establishing a potential difference between the charging gate of one of the transistors and its control gate, monitoring a parameter dependent upon a threshold voltage of the one transistor and increasing the potential difference to transfer charge between the charging gate and the floating gate, through the insulating material layer between the charging gate and the floating gate, until a predetermined threshold voltage is established without involving excessive electric field stress in the region of the channel of that transistor;

(iii) establishing a potential difference between the charging gate of the other of the transistors and its control gate, monitoring a parameter dependent upon a threshold voltage of said other of the transistors and increasing the potential difference to transfer charge between the charging gate and the floating gate, through the insulating material layer between the charging gate and the floating gate, until a predetermined threshold voltage is established without excessive electric field stress in the region of the channel of such other transistor;

(iv) with the substrate, sources, drains, control gates and charging gates connected in common, exposing the dosimeter to the ionizing radiation; and (v) following such irradiation, determining the amount of such ionizing radiation absorbed by the device by measuring a parameter dependent upon the difference between the threshold voltages of the pair of transistors.

Preferably, the floating gates of the two transistors are charged to equal and opposite levels.

According to a third aspect of the invention, there is provided a dosimeter comprising a matched pair of insulated gate field effect transistors sharing a common substrate, each of said transistors having a source and a drain formed in the substrate, a floating gate separated from the substrate by an insulating layer, a control gate overlapping a first part of the floating gate and insulated therefrom, and a charging gate overlapping a second part of the floating gate and insulated from both the floating gate and the control gate, the second part being remote from a channel between the source and the drain.

Further objects and features of this invention will become clear from the following description of preferred embodiments, which are described by way of example only and with reference to the accompanying drawings.

DESCRIPTION OF PREFERRED EMBODIMENTS

Figure 1:
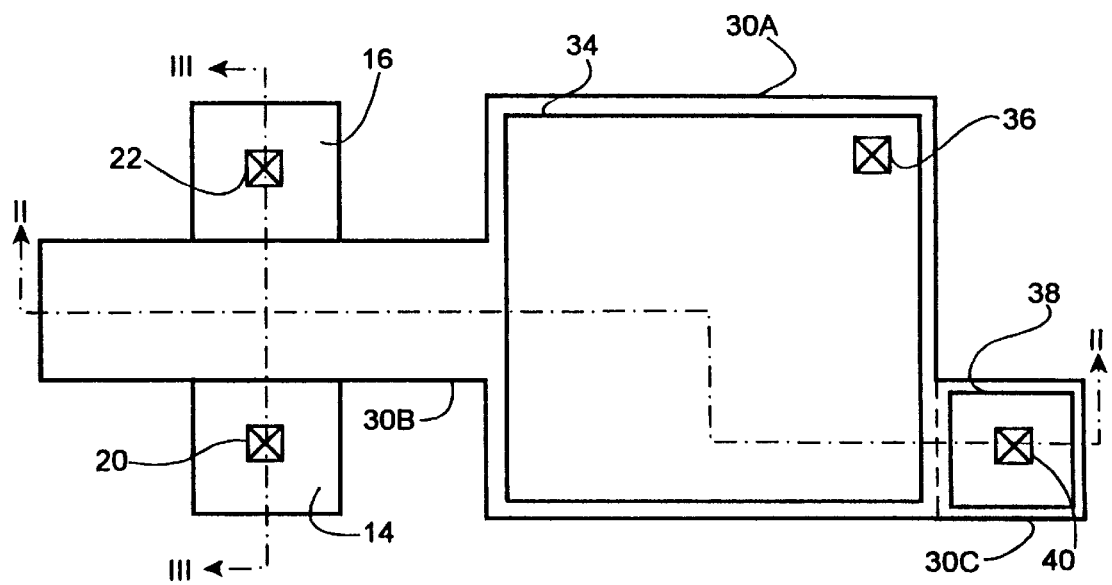
FIG. 1 is a schematic plan view of a portion of a dosimeter comprising a MOSFET.

In the drawings, corresponding or identical elements in the different Figures have the same reference numeral.

Figure 2:
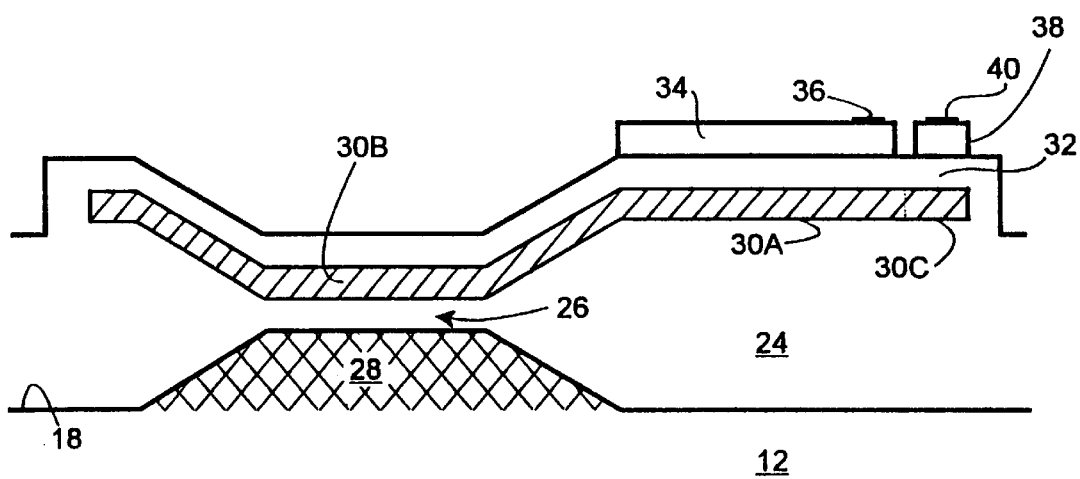
FIG. 2 is a cross-sectional partial view of the MOSFET taken on the line II—II of FIG. 1.
Figure 3:
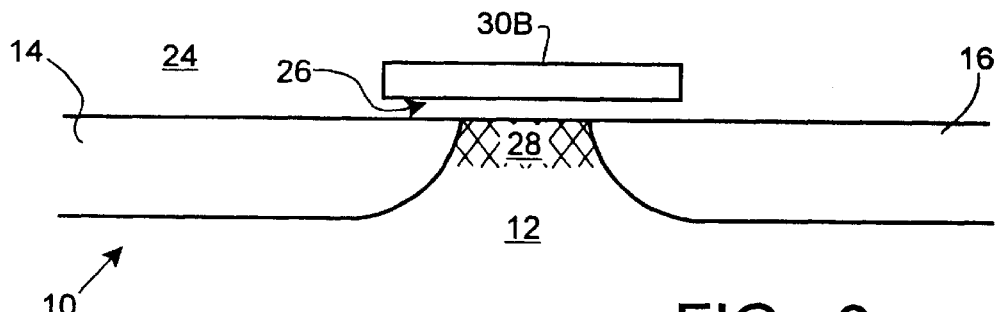
FIG. 3 is a cross-sectional partial view of the MOSFET taken on the line III—III of FIG. 1.

For purposes of illustration, FIGS. 1, 2 and 3 illustrate the structure of a p-channel floating gate MOSFET dosimeter 10. It should be appreciated, however, that the invention is applicable, *mutatis mutandis*, to n-channel devices. The MOSFET dosimeter comprises a substrate 12 (FIG. 2) with a source 14 and drain 16 formed in its surface 18. The source 14 and drain 16 have terminals 20 and 22, respectively. An insulating layer 24 provided on the surface 18 of substrate 12 comprises a relatively thin region of gate oxide 26 over the channel 28 between the source 14 and drain 16, and thicker field oxide portions around the channel. A floating gate 30, formed from a layer of conductive material, comprises a rectangular portion 30A, an elongate portion 30B which extends from the middle of one edge of the rectangular portion 30A, and a small rectangular protrusion 30C which protrudes from the opposite edge of the rectangular portion 30A. The elongate portion 30B extends between the source 14 and drain 16 and is isolated electrically from the channel 28 by the gate oxide 26. A second insulating layer 32 covers the floating gate 30. A control gate 34, also of conducting material and having a terminal 36, is provided upon the second insulating layer 32 and overlies the floating gate 30. In FIG. 1, the control gate 34 is shown slightly smaller than the floating gate rectangular portion 30A, but it could be the same size or even slightly larger. A charging gate 38, which is much smaller than control gate 34, overlies the protrusion 30C of the floating gate 30 and is insulated from it by the insulating layer 32. The charging gate 38 has a terminal 40.

Preferably, the floating gate 30, control gate 34 and charging gate 38 are formed from polysilicon and the insulating layers 24 and 32 from thermally-grown silicon dioxide.

To prepare the dosimeter for use, charge is placed upon the floating gate 30, causing a shift in the threshold voltage $V_T$. (The threshold voltage $V_T$ of the MOSFET is defined in this specification to be the control gate bias required to give an arbitrarily-specified channel current at a given drain-source bias $V_{DS}$). There is no electrical connection to the floating gate 30 which, as can be seen from the cross-sectional views of FIGS. 2 and 3, is electrically isolated from the channel region 28 by the gate oxide 26 and from the control gate 34 by the insulating layer 32. The charging gate 38 is used to charge the floating gate 30 prior to use of the dosimeter for radiation monitoring. Because the charging gate 38 is remote from the channel 28, the charging can be done without stressing the gate oxide region 26 and channel 28. Charge is applied to the floating gate 30 by maintaining the substrate 12, source 14, drain 16, and control gate 34 at voltages such that the potential difference between any two of them is less than the maximum normal operating voltage of the MOSFET, typically 5 volts, while a voltage bias greater than the maximum normal operating voltage is applied to the charging gate 38.

Before the floating gate 30 is charged, however, the threshold voltage of the MOSFET 10 is measured since the absorbed radiation dose will be determined by comparing threshold voltage levels before and after irradiation.

Figure 4A:
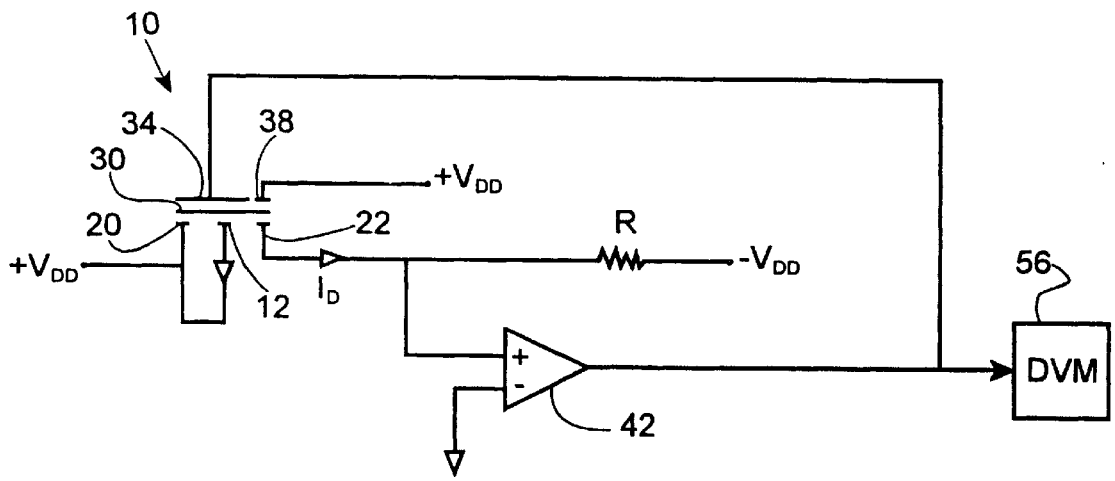
FIG. 4A is a simplified schematic diagram of a circuit for measuring the threshold voltage of the MOSFET of FIG. 1.

FIG. 4A shows a simple measuring circuit for measuring the threshold voltage of the MOSFET 10. The source 20, substrate 12, and charging gate 38 are connected to supply rail at a fixed potential $+V_{DD}$, typically 1 volt. The drain 22 is connected by resistor R to a negative supply rail at voltage $-V_{DD}$, and the control gate 34 is connected to the output of the operational amplifier 42. A digital voltmeter is connected to the output of the operational amplifier 42 to measure the threshold voltage. In operation, the conductance of the MOSFET channel is adjusted automatically to the conductance of the resistance R (typically around 100 Kilohms to give a drain current of about 10 microamp. The output of the operational amplifier 42 then is the threshold voltage, as defined herein. Once the initial threshold voltage has been measured, the floating gate is charged by means of the circuit shown in FIG. 4B, which differs only slightly from that of FIG. 4A.

Figure 4B:
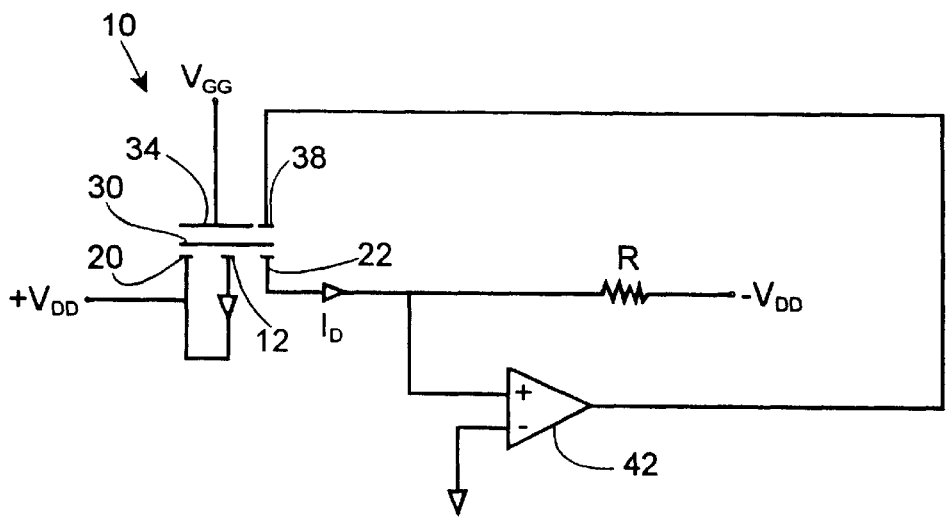
FIG. 4B is a simplified schematic diagram of a circuit for charging the MOSFET of FIG. 1.

Referring now to FIG. 4B, the circuit for placing (negative) charge upon the floating gate 30, thereby making the threshold voltage more positive, comprises a feedback loop including an operational amplifier 42. The inverting input of the amplifier 42 is grounded. The non-inverting input is connected to the drain terminal 22, and, via a resistor R, typically of 100 Kilohms, to a supply rail at $+V_{DD}$ volts. The output of the amplifier 42 is connected to the charging gate 38. The source terminal 20 and substrate 12 are connected to a supply rail at voltage $+V_{DD}$ while the terminal 36 of control gate 34 is connected to a source of a bias voltage $V_{GG}$.

Applying a positive bias to the charging gate 38 places a positive charge on the floating gate 30, while applying a negative bias leaves a negative charge on the floating gate 30. Assuming that the initial measurement shows that the threshold voltage of the device is more negative than the desired threshold voltage, the control gate bias $V_{GG}$ is set to the desired threshold voltage. Assuming the magnitude of the drain current $I_D$ initially is less than the target value $V_{DD}/R$, the operational amplifier 42 makes the charging gate bias more negative until electrons tunnel between the charging gate 38 and the floating gate 30. The extra negative charge on the floating gate 30 attracts holes to the channel surface, increasing the drain current $I_D$. The feedback loop forces this process to continue until drain current $I_D$ reaches the target value.

If the initial measurement shows that the threshold voltage is more positive than the desired target threshold voltage, the circuit of FIG. 4B can also used to apply positive charge to the floating gate 30, thereby forcing the threshold voltage more negative. Once again, the control gate bias is set to the desired threshold voltage. The magnitude of the drain current $I_D$ is initially greater than the target value $V_{DD}/R$, so the operational amplifier 42 makes the charging gate bias more positive until electrons tunnel from the floating gate 30 to the charging gate 38, giving the floating gate 30 a net increase in positive charge. The extra positive charge on the floating gate 30 repels holes from the channel surface, reducing drain current $I_D$. The feedback loop forces this process to continue until drain current $I_D$ reaches the target value.

The bias voltage applied to the control gate is small, typically no greater than the maximum normal operation voltage, and there is no potential difference between any two of the substrate, source, drain and control gate which is greater than the maximum normal specified operating voltage of the device.

The bias voltage applied to the charging gate 38 is much greater, being sufficient for Fowler-Nordheim tunnelling to cause electrons to flow between the charging gate 38 and the floating gate 30 through the interpoly oxide 32 separating them. Tunnelling occurs first through the portion of insulator 30 separating the charging gate 38 and the floating gate 30 since, because the area of overlap of the charging gate 38 with the floating gate 30 is much smaller than the overlap of the control gate 34 with the floating gate 30, the capacitance between the charging gate 38 and the floating gate 30 is much smaller than that between the floating gate 30 and control gate 34. Accordingly, most of the potential difference applied between the charging gate 38 and the control gate 34 is dropped between the floating gate 30 and the charging gate 38.

This method of pre-charging is preferred because it does not require high electric field strengths in the vicinity of the sensitive channel area of the MOSFET, i.e. the gate oxide 26 and channel 28. Electric stress in the channel area is believed to generate fast surface states or "interface traps", perhaps leading to noise and long-term stability problems.

To use the pre-charged MOSFET dosimeter for radiation detection, the source 14, drain 16, substrate 12 (body), control gate 34 and charging gate 38 are connected together electrically. It should be noted that no connection to a battery or other external power supply is required during radiation detection. If any ionizing radiation capable of generating electron-hole pairs in the gate oxide, field oxide and/or inter-gate insulators passes through the device, the floating gate 30 will be partially discharged. This in turn produces a shift in the threshold voltage, from which the absorbed dose can be deduced. In general, the relationship between the change in threshold voltage and the absorbed dose must be determined empirically for a given device geometry and manufacturing process. Once the relationship is established, it can be applied to any device of the same dimensions manufactured with the same process.

The sensitivity of a MOSFET dosimeter is defined in the art as the ratio of the shift in threshold voltage to the absorbed radiation dose. This sensitivity can be adjusted by varying the relative sizes of the control gate 34 and floating gate 30. The smaller the area of the control gate 34 relative to the floating gate 30, the larger will be the shift in threshold voltage (as defined above) in response to a given dose of ionizing radiation. Hence, making the area of control gate 34 much smaller than that of the floating gate portion 30A would provide increased sensitivity. It should be noted, however, that making the area of the control gate 34 small relative to the floating gate 30 also increases the magnitude of random fluctuations in the measured threshold voltage resulting from random changes in interface trap occupancy. In consequence, gains in sensitivity obtained by this technique may be offset by an increase in noise. In a given application, the relative area of overlap of the control gate over the floating gate compared to the overlap of the floating gate over the channel and field regions should preferably be made small enough that the noise generated by the MOSFET sensor is larger than that produced by other components in the circuitry used to determine the threshold voltage. There is no advantage to further reduction in the area of control gate overlapping the floating gate.

Typically, the threshold voltage of a MOSFET dosimeter will change by approximately 2 mV for a 1° C. change in temperature. In order to reduce the effects of such variations, a matched pair of MOSFET dosimeters may be fabricated on a common substrate, as shown in FIG. 5, in which corresponding elements have the same reference numbers as in FIGS. 1–3, but with a suffix 1 or suffix 2, and the various materials are the same as those used in the embodiment of FIG. 1.

Figure 5:
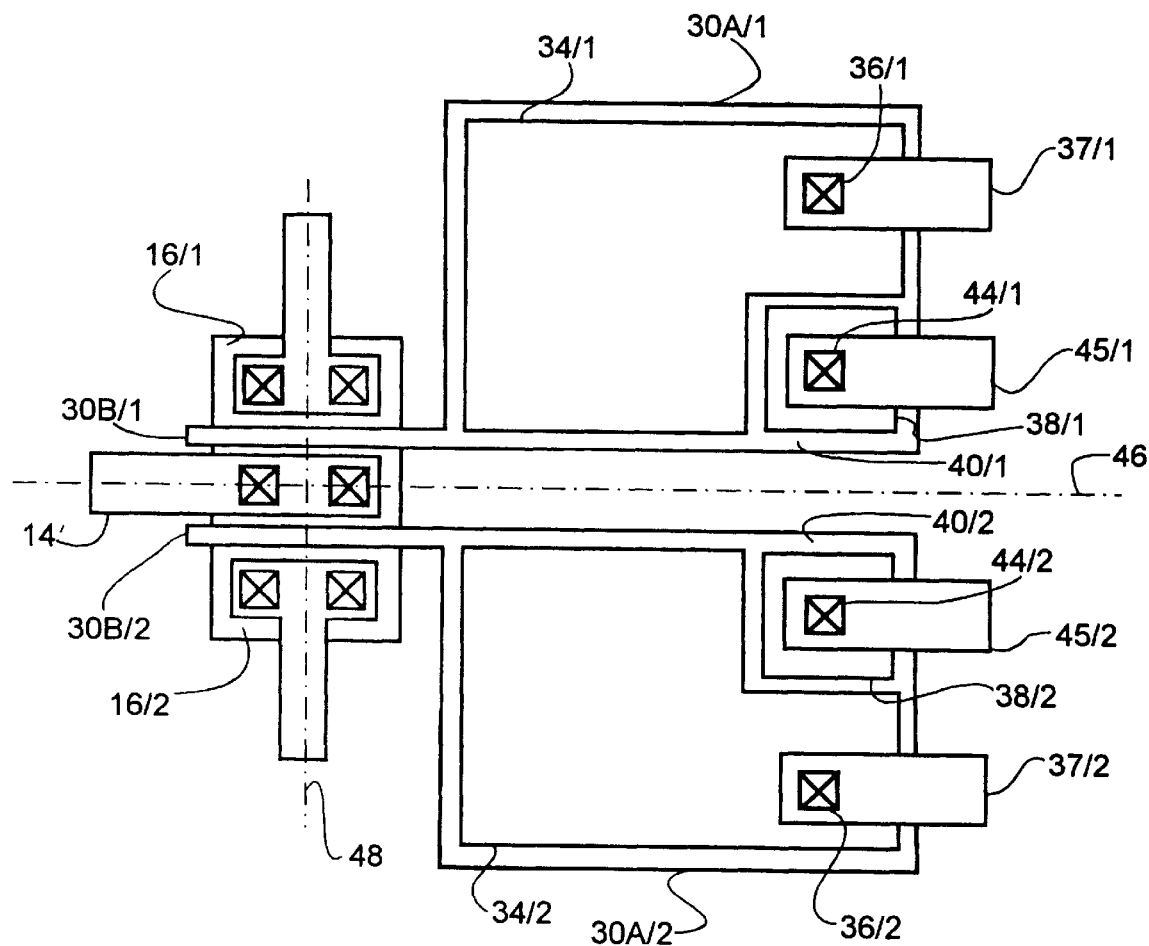
FIG. 5 is a schematic plan view of a differential dosimeter comprising a pair of MOSFETs sharing a common source and arranged for differential biasing.

Referring to FIG. 5, a common source 14' is provided between a pair of drains 16/1 and 16/2, which define respective channels (not shown) between the drains and the common source 14. A first floating gate 30/1 has a rectangular extension portion 30A/1 and an elongate portion 30B/1 extending across the channel 28/1. In contrast to the MOSFET of FIG. 1, where the elongate portion protrudes from the middle of the rectangular portion, this elongate portion 30B/1 protrudes from the corner of the rectangular portion adjacent the channel 28/1. A first control gate 34/1 is provided above the floating gate 30/1 and separated therefrom by insulating material (not shown). A control gate terminal 36/1 with a terminal extension 37/1 is attached to one corner of the edge of the control gate remote from the drain 16/1. The other corner of the same edge of the control gate 34/1 is notched to leave a rectangular area 40/1 of the floating gate 30/1 uncovered. A small rectangular charging gate 38/1 is provided in the notched area 40/1 and carries a charging gate terminal 44/1.

The second MOSFET comprises a second floating gate 30/2, second control gate 34/2, second control gate terminal 36/2, second charging gate 38/2 and second charging gate terminal 44/1 disposed at the opposite side of an axis 46 through the common source 14' and perpendicular to an axis 48 joining the two drains 16/1 and 16/2. The gates of the second MOSFET are configured as a mirror image to the corresponding gates of the first MOSFET about the axis 46 through the common source 14'.

Because these two MOSFETs are formed in close proximity on the same silicon integrated circuit, they must be at almost exactly the same temperature, since the power dissipation in the transistors is extremely small for operation as a dosimeter. The two MOSFETs are identical in structure. Different charges are placed on the floating gates 30/1 and 30/2 of the two MOSFETs by means of the charging gates 38/1 and 38/2, respectively. This leaves the two MOSFETs with different threshold voltages. The output of the dosimeter is taken to be the difference $\Delta V_T$ between the threshold voltages $V_T/1$ and $V_T/2$ of the two devices. Since the floating gates have different initial charges, the change in $V_T$ under irradiation is different for the two MOSFETs, so there is a net change in $\Delta V_T$.

A floating gate MOSFET dosimeter as shown in FIG. 5 has been constructed and tested. Fabrication of the dosimeter was carried out using the Mitel1.5 CM-channel technology by Mitel Semiconductor Ltd. of Kanata, Ontario, Canada. The gate material was polysilicon, and the insulating layers were of thermally grown silicon dioxide. The gate oxide thickness was 27 nm, the field oxide thickness 600 nm, and the interpoly oxide thickness 48 nm. The length and width of each channel were both 20 $\mu$m while the floating gate and control gate extensions over the field oxide were approximately 200 $\mu$m by 50 $\mu$m. The charging gate was 6 $\mu$m by 6 $\mu$m.

Prior to irradiation, the floating gates of both MOSFETs were discharged by exposure to ultra violet light from a commercial EPROM eraser for a period of many hours. Using a circuit like that shown in FIG. 4A, the threshold voltages of both devices were determined by setting $V_{SB}=0$, $V_{DS}=0.1$ V, and finding the value of $V_{GS}$ required to give $I_D=10$ $\mu$A. Following this procedure, threshold collapse $V_T$ was found to be −2.5 V for both devices. A negative bias was then applied to the charging gate of one MOSFET, while all other source, drain, control gate and substrate terminals of the two MOSFETs were maintained at a common potential (ground). The charging gate bias was then increased until the current through the charging terminal reached a value of approximately 10 picoamps. The current was held at this level for several seconds. At the completion of this operation, the threshold voltage of the charged MOSFET had increased to 7 V. The charge on the floating gate of the other MOSFET was unchanged.

Figure 6:
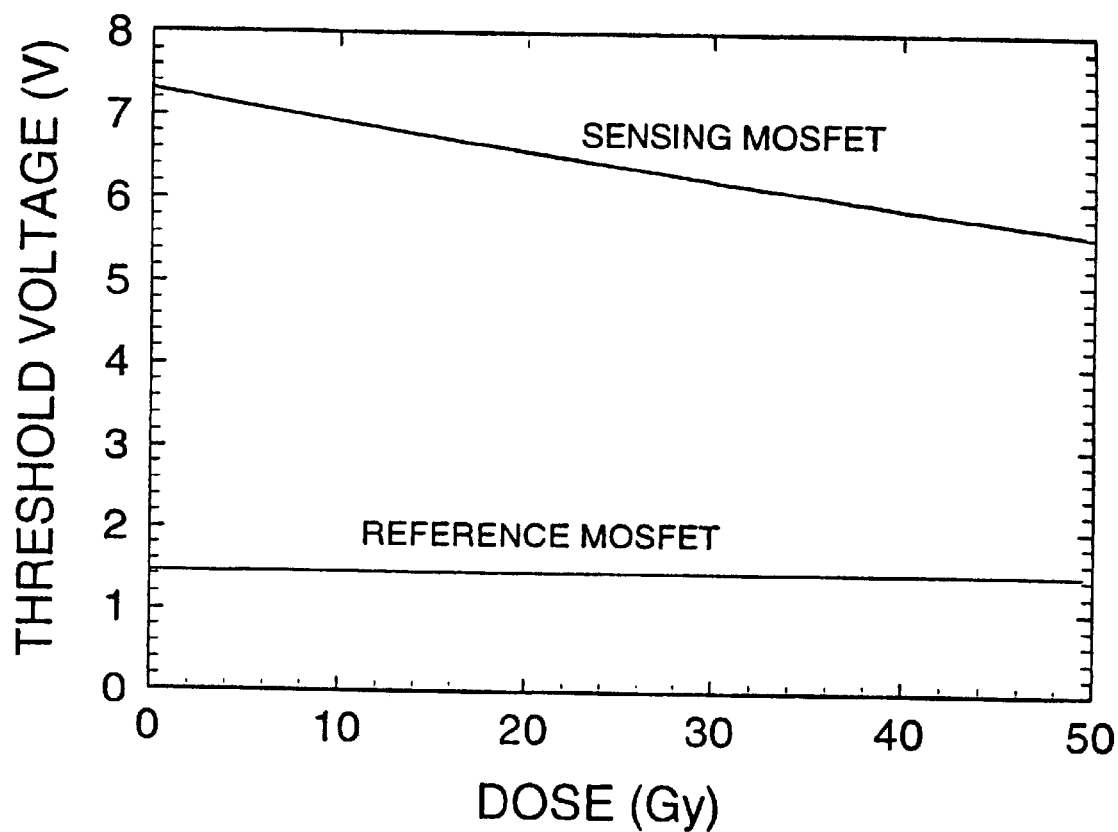
FIG. 6 illustrates the change in threshold voltage of one of the MOSFETs of FIG. 5 when the other is left uncharged as a reference.

Following charging, the dosimeter was covered with a 5 mm thick acrylic sheet and exposed to a 6 kCi $^{60}$Co source at a distance of 1 meter. The change in threshold voltage for the two MOSFETs as a function of absorbed dose is shown in FIG. 6. Under irradiation, the threshold voltage for the pre-charged MOSFET decayed towards that of the other device, which remained substantially constant. The dosimeter output—the difference $\Delta V_T$ between their threshold voltages—is shown as a function of absorbed dose in FIG. 7.

Figure 7:
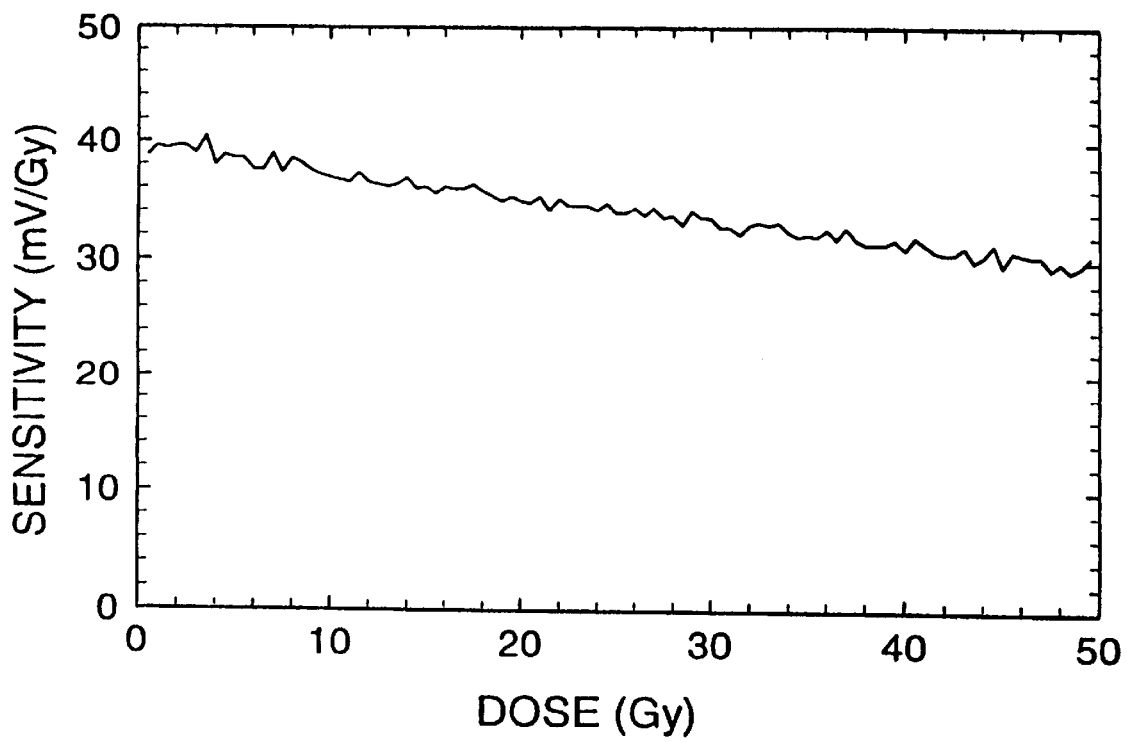
FIG. 7 illustrates the sensitivity of the dosimeter of FIG. 5 as a function of absorbed dose when only the one MOSFET has been charged.

As can be seen from FIG. 7, which illustrates the sensitivity of the differential dosimeter of FIG. 5 as a function of absorbed dose when only one MOSFET is charged, the sensitivity decreases as the amount of absorbed radiation increases.

Subsequently, the following charging procedure was found to be preferable:

With the substrate and source terminals grounded, a voltage equal to the desired threshold voltage, typically ±5 volts was applied to the control gate and a voltage of −1 volt applied to the drain terminal:

1. The drain current $I_D$ was monitored.
2. The bias voltage at the charging gate was set to positive or negative depending upon whether the drain current $I_D$ was above or below the required level of, say, 10 μA. (If, say, $I_D$ was zero, the voltage applied to the charging gate would be negative).
3. The voltage on the charging gate 38 was increased in magnitude gradually until the drain current reached 10 μA. Typically, this voltage would be swept from, say, 20 volts to 30 volts, i.e. much greater than the normal operating voltage of 5 volts.

For optimum sensitivity, equal and opposite charges are applied to the floating gates 30A/1 and 30A/2 by means of their respective charging gates 38A/1 and 38A/2 using the circuit of FIG. 4B. Following irradiation, the radiation dose or absorbed radiation is determined by applying identical fixed drain-source and source—substrate biases, and varying the gate-source bias of each device until the drain current in each is identical.

Figure 8:
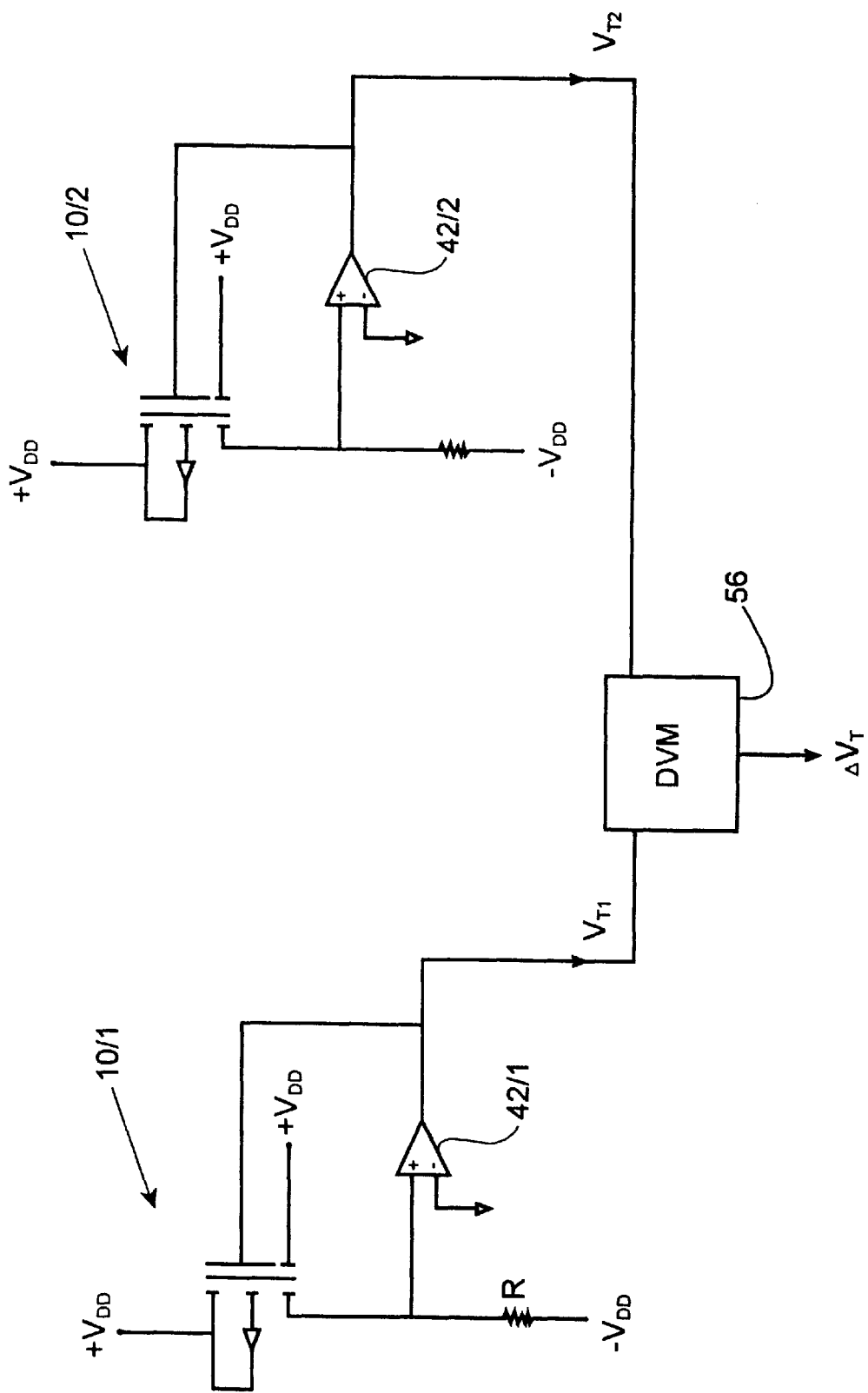
FIG. 8 is a simplified schematic diagram of a circuit for measuring the radiation absorbed by the differential dosimeter of FIG. 5.

A suitable circuit for measuring the change in the difference between the threshold voltage levels, as shown in FIG. 8, effectively duplicates the measuring circuit of FIG. 4A. Hence, it comprises two operational amplifiers 42/1 and 42/2, respectively, each connected in a feedback loop with a corresponding one of the pair of MOSFETs 10/1 and 10/2. Each amplifier has its non-inverting input connected to the drain of its transistor which also is connected to the negative supply rail at voltage $-V_{DD}$ via a resistance of, typically, 100 kilohms. The substrate, source and charging gate are connected to a positive supply rail at voltage $+V_{DD}$. The inverting input of the amplifier is grounded and its output is connected to both the control gate and to a respective one of two differential inputs of digital voltmeter 56. Typically, $V_{DD}$ is about 1 volt. With the control gates set to the respective threshold voltages (previously measured), the voltage measured by the digital voltmeter is the difference between the threshold voltages and hence a measure of the differential change in the charge on the two floating gates.

Figure 9:
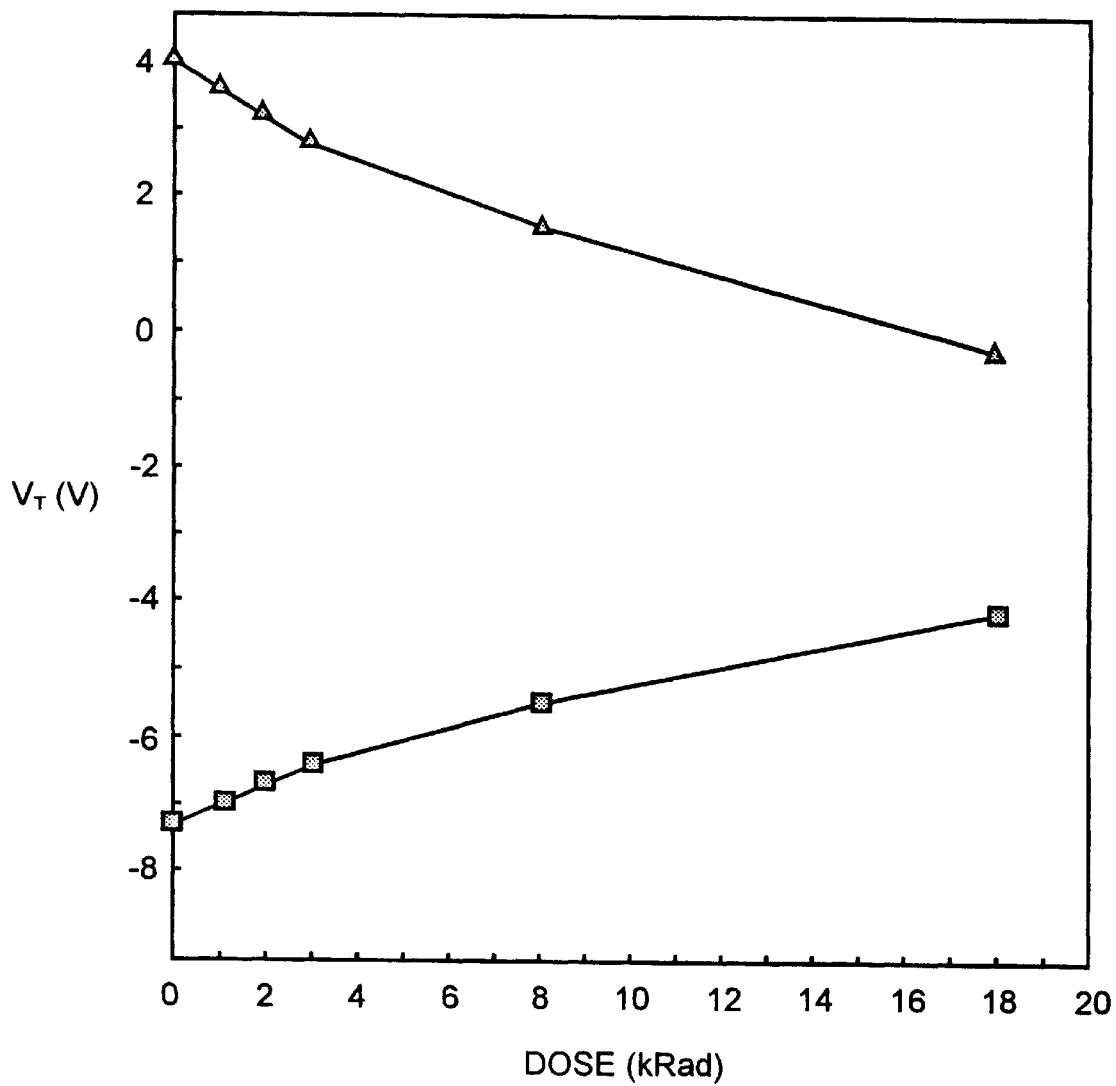
FIG. 9 illustrates the change in threshold voltage for the two MOSFETs of FIG. 5 as a function of absorbed dose when they have been charged oppositely.

FIG. 9 illustrates how the threshold voltages of the two devices change as a function of absorbed dose. It should be noted that operation with opposite polarity charging of the two floating gates enhances sensitivity as compared with the known passive dosimeters. In fact it would be approximately double that depicted in FIG. 7 for the matched pair with only one of the MOSFETS charged.

Although, in the specific embodiments described herein, the voltage bias applied to the charging gate was greater than the maximum normal operating voltage, it is envisaged that, in certain circumstances, a lower voltage could be used.

The measurement of the threshold voltage changes may be done manually or by means of electronic data logging equipment.

In the above-described embodiments, the relatively large floating gate extension portion 30A also provides increased sensitivity to radiation. Because the field oxide is much thicker than the gate oxide in conventional CMOS technology, far more charge is generated by radiation in the field oxide than in the gate oxide. It is therefore highly advantageous to overlap the floating gate over the field oxide, to facilitate collection of radiation-generated charge from this oxide.

If yet greater sensitivity were required, the rectangular extension 30A could be duplicated on the other side of the channel 28. Various other modifications may be made to the above-described embodiments within the spirit and scope of the present invention.

An advantage of dosimeters embodying the present invention is that they may be fabricated using conventional, commercial CMOS processes. Moreover, the dosimeters can be discharged and re-charged many times with full recovery of the initial sensitivity, unlike known devices which do not fully recover, or must be annealed at relatively high temperatures.

What is claimed is:

1. A method of monitoring ionizing radiation using an insulated gate field effect transistor dosimeter having a source and a drain formed in a substrate, a floating gate separated from the substrate by an insulating layer, a control gate overlapping a first part of the floating gate and insulated therefrom, and a charging gate overlapping a second part of the floating gate and insulated therefrom, the second part being remote from a channel between the source and drain, the method comprising the steps of:

(i) maintaining potential differences between the substrate, source, drain and control gate lower than a maximum normal operating voltage of the device;

(ii) pre-charging the floating gate by establishing a potential difference between the charging gate and the control gate, monitoring a parameter dependent upon a threshold voltage of the transistor and increasing the potential difference to transfer charge between the charging gate and the floating gate through the insulating layer material between the floating gate and the charging gate until a predetermined threshold voltage is established without involving excessive electric field stress in the region of the channel;

(iii) with the substrate, source, drain, control gate and charging gate maintained at a common electrical potential, exposing the dosimeter to the ionizing radiation;

(iv) following such irradiation, measuring a parameter affected by change in the charge applied to the floating gate and determining the amount of such ionizing radiation absorbed by the transistor in dependence upon the difference between floating gate charge before and after irradiation.

2. A method as claimed in claim 1, wherein the parameter measured to determine the amount of radiation is the same parameter that was measured during charging of the floating gate.

3. A method as claimed in claim 1, wherein the pre-charging of the floating gate includes the step of measuring drain current corresponding to the predetermined threshold voltage and the step of determining the amount of absorbed radiation includes the steps of applying a fixed drain-source bias, measuring the drain current, and adjusting the control gate bias until the drain current is the same as that corresponding to the predetermined threshold voltage, the control gate bias to achieve this being equivalent to the threshold voltage of the transistor.

4. A method of monitoring ionizing radiation using a dosimeter comprising a matched pair of insulated gate field effect transistors sharing a common substrate, each having a source and a drain formed in the substrate, a floating gate separated from the substrate by an insulating layer, a control gate overlapping a first part of the floating gate and insulated therefrom, and a charging gate overlapping a second part of the floating gate and insulated from both the floating gate and the control gate, the second part being remote from a channel between the source and drain, the method comprising the steps of:

(i) maintaining potential differences between the substrate, source, drain and control gate of each transistor lower than a maximum normal operating voltage of the transistor;

(ii) establishing a potential difference between the charging gate of one of the transistors and its control gate, monitoring a parameter dependent upon a threshold voltage of the one transistor and increasing the potential difference to transfer charge between its charging gate and its floating gate through the insulating layer material between the floating gate and the charging gate until a predetermined threshold voltage is established without involving excessive electric field stress in the region of the channel of that transistor;

(iii) establishing a potential difference between the charging gate of the other of the transistors and its control gate, monitoring a parameter dependent upon a threshold voltage of said other of the transistors and increasing the potential difference to transfer charge between its charging gate and its floating gate through the insulating layer material between the floating gate and charging gate until a predetermined threshold voltage is established without involving excessive electric field stress;

(iv) with the substrate, sources, drains, control gates and charging gates of the transistors connected in common, exposing the device to the ionizing radiation; and (v) following such irradiation, determining the amount of such ionizing radiation absorbed by the transistors by measuring a parameter dependent upon the difference between the threshold voltages of the pair of transistors.

5. A method as claimed in claim 4, wherein the floating gates of the two transistors are charged to equal and opposite levels.

6. A dosimeter comprising a matched pair of insulated gate field effect transistors sharing a common substrate, each of said transistors having a source and a drain formed in the substrate, a floating gate separated from the substrate by an insulating layer, a control gate overlapping a first part of the floating gate and insulated therefrom, and a charging gate overlapping a second part of the floating gate and insulated from both the floating gate and the control gate, the charging gate being remote from a channel between the source and drain.

7. A dosimeter as claimed in claim- 6, wherein the control gate has an area considerably larger than the area of the charging gate.

* * * * *